(12) United States Patent
Clark et al.

(10) Patent No.: US 9,099,948 B2
(45) Date of Patent: Aug. 4, 2015

(54) ALTERNATOR ASSEMBLY WITH OPPORTUNISTIC VOLTAGE REGULATION SYSTEM

(75) Inventors: Daniel Joseph Clark, Edmond, OK (US); David Leonel Villarreal, Edmond, OK (US)

(73) Assignee: Remy Technologies, LLC, Pendleton, IN (US)

( * ) Notice: Subject to any disclaimer, the term of this patent is extended or adjusted under 35 U.S.C. 154(b) by 1123 days.

(21) Appl. No.: 13/031,512

(22) Filed: Feb. 21, 2011

(65) Prior Publication Data

US 2012/0013310 A1    Jan. 19, 2012

Related U.S. Application Data

(60) Provisional application No. 61/363,992, filed on Jul. 13, 2010.

(51) Int. Cl.
| H02P 1/00 | (2006.01) |
| H02P 9/10 | (2006.01) |
| H02J 7/14 | (2006.01) |
| H02P 101/45 | (2015.01) |

(52) U.S. Cl.
CPC ............... *H02P 9/10* (2013.01); *H02J 7/1446* (2013.01); *H02P 2101/45* (2015.01); *Y02T 10/92* (2013.01)

(58) Field of Classification Search
USPC ......... 318/255, 268, 269, 270, 271, 273, 274, 318/278; 180/65.1, 197; 322/7, 17, 28, 29
See application file for complete search history.

(56) References Cited

U.S. PATENT DOCUMENTS

| 3,403,747 | A | * | 10/1968 | De Castelet Gaetan De Coye | ............... 477/138 |
| 3,818,291 | A | * | 6/1974 | Miyake | ............... 318/139 |
| 5,363,300 | A | * | 11/1994 | Lin | ............... 702/141 |
| 5,589,743 | A | * | 12/1996 | King | ............... 318/139 |
| 5,719,485 | A | * | 2/1998 | Asada | ............... 322/28 |
| 6,295,500 | B1 | * | 9/2001 | Cullen et al. | ............... 701/93 |
| 6,700,354 | B2 | * | 3/2004 | Okuno et al. | ............... 322/29 |
| 7,091,626 | B2 | | 8/2006 | Bluemel et al. | |
| 7,283,899 | B1 | | 10/2007 | Harmon et al. | |
| 7,623,331 | B2 | | 11/2009 | Harmon et al. | |
| 8,000,871 | B2 | * | 8/2011 | Braunberger et al. | ............... 701/70 |
| 8,239,102 | B2 | * | 8/2012 | Chen | ............... 701/45 |
| 2002/0087252 | A1 | * | 7/2002 | Shimizu et al. | ............... 701/84 |
| 2002/0149347 | A1 | * | 10/2002 | Asada | ............... 322/28 |
| 2010/0123439 | A1 | | 5/2010 | Steel, Jr. et al. | |
| 2010/0231180 | A1 | | 9/2010 | Harmon et al. | |

OTHER PUBLICATIONS

BMW Introduces Intelligent Alternator Control with Regenerative Braking; Reduces Fuel Consumption by About 4%, Sep. 29, 2006, http://www.greencarcongress.com/2006109/bmw_introduces_html.

* cited by examiner

*Primary Examiner* — Bentsu Ro
*Assistant Examiner* — Thai Dinh
(74) *Attorney, Agent, or Firm* — Maginot, Moore & Beck LLP (57) ABSTRACT

An electrical machine has been developed that opportunistically regulates the voltage supplied to the coil of the electrical machine. The electrical machine includes a stator winding, a rotatable electromagnet, and a voltage regulator. The voltage regulator is configured to control an output voltage of the electrical machine. The regulator is configured to vary the magnitude of the output voltage based at least in part on acceleration of the vehicle.

20 Claims, 8 Drawing Sheets

ALTERNATOR ASSEMBLY WITH OPPORTUNISTIC VOLTAGE REGULATION SYSTEM

CROSS-REFERENCE TO RELATED APPLICATION

This application claims priority from U.S. Provisional Patent Application No. 61/363,992, filed Jul. 13, 2010, the contents of which are incorporated herein by reference.

TECHNICAL FIELD

The present disclosure relates to the field of vehicle electrical systems and more particularly, to arrangements and methods for controlling a vehicle alternator.

BACKGROUND

In a common application, an alternator is a rotating electrical machine that converts mechanical energy from an operating vehicle engine into electrical energy, which is used to supply power to electrical loads of the vehicle. For example, the electrical energy produced by the alternator charges a vehicle battery and supplies power to a headlight system. The alternator generally includes a rotatable electromagnet with field coil and a stator having a plurality of stator windings. Typically delivered through a belt drive system, operation of the engine supplies the alternator with mechanical energy, which results in rotation of the electromagnet relative to the stator windings. The rotating electromagnet's field coil is supplied with an electrical current, such that the field coil generates a rotating magnetic field. The rotating magnetic field induces an alternating current ("AC") electrical energy in the stator windings. The alternator includes a rectifier to convert the AC electrical energy to a direct current ("DC") output power. A vehicle wiring system couples the DC output power to the battery and the other electrical loads of the vehicle.

The alternator further includes a voltage regulator, which regulates and controls the DC output power according to its voltage by controlling the magnitude of the current supplied to the field coil. In particular, the voltage regulator maintains the DC output voltage at a particular set point voltage level, which depends primarily on the basic electrical design of the vehicle and its battery. The voltage regulator increases the magnitude of the field current in response to an increased electrical power demand from the vehicle, and the voltage regulator decreases the magnitude of the field current in response to a decreased electrical power demand from the alternator.

The amount of mechanical energy required to rotate the electromagnet relative to the stator depends on the magnitude of the power output of the alternator. When the voltage regulator increases the magnitude of the field current and thus electrical power output of the alternator in response to increase vehicle electrical load, a corresponding increase in the amount of mechanical energy (supplied by the vehicle engine) is required to rotate the field coil and induce the output. Conversely, when the voltage regulator decreases the magnitude of the field current, a decreased amount of mechanical energy is required to rotate the field coil.

The vehicle cranking battery is a chemical energy conversion device whose behavior is dependent upon temperature. When charging the battery in cold conditions, more voltage from the alternator is required in order to convert electrical charge into stored chemical potential energy. When charging the battery in hot conditions, a lower voltage is required to prevent damage to the battery as a result of excess electrical energy being converted to heat.

Typically, the modern voltage regulator is designed to adjust the vehicle voltage level according the temperature conditions of the vehicle.

The voltage regulator of a conventional alternator regulates the magnitude of the set point voltage level independent of the mechanical load on the vehicle engine. The mechanical load of the engine depends on, among other factors, the terrain upon which the vehicle is traveling and the driving style of the operator. For example, the mechanical load on the engine is generally at a minimum when the engine operates near idle speed, such as when an operator maintains the vehicle in a stationary position and when the operator activates the braking system to reduce the speed of the vehicle. In comparison, however, the mechanical load on the engine is generally at a maximum when the operator accelerates the vehicle, such as when accelerating to highway speed, for example. If an electrical component of the vehicle requires an increased level of electrical power at the same time the vehicle is accelerating, then the voltage regulator maintains the vehicle voltage level by increasing the electrical output. However, increasing the electrical output level increases the amount of mechanical energy required to rotate the field coil relative to the stator. This additional mechanical load imparted on the engine by the alternator may reduce the rate of acceleration of the vehicle. In response to the reduced acceleration, the vehicle operator may supply the engine with additional fuel, thereby reducing the fuel economy of the engine. Therefore, further advancements for vehicle alternators are desirable.

SUMMARY

An electrical machine for a vehicle has been developed. The electrical machine includes a stator winding, a rotatable electromagnet, and a voltage regulator. The voltage regulator is configured to control an output voltage of the electrical machine. The regulator is configured to vary the magnitude of the output voltage based at least in part on acceleration of the vehicle.

According to another embodiment of the present disclosure, a method has been developed of controlling an output voltage of an electrical machine, which is associated with a vehicle. The method includes determining vehicle acceleration. The method also includes decreasing a magnitude of the output voltage during positive vehicle acceleration and increasing the magnitude of the output voltage during negative vehicle acceleration.

According to yet another embodiment of the present disclosure an alternator apparatus includes a stator including a plurality of stator windings, the stator being associated with a vehicle, a field coil, an acceleration sensor configured to detect an acceleration of the vehicle and a controller configured to execute a field current control program, the field current control program being configured to cause the controller to deliver one of a plurality of currents of different magnitudes to the field coil depending at least in part on the detected acceleration.

The above-described features and advantages, as well as others, will become more readily apparent to those of ordinary skill in the art by reference to the following detailed description and accompanying drawings. While it would be desirable to provide an alternator that provides one or more of the foregoing or other advantageous features as may be apparent to those reviewing this disclosure, the teachings disclosed herein extend to those embodiments that fall within the scope of the appended claims, regardless of whether they accomplish one or more of the above-mentioned advantages.

DETAILED DESCRIPTION

Figure 1:
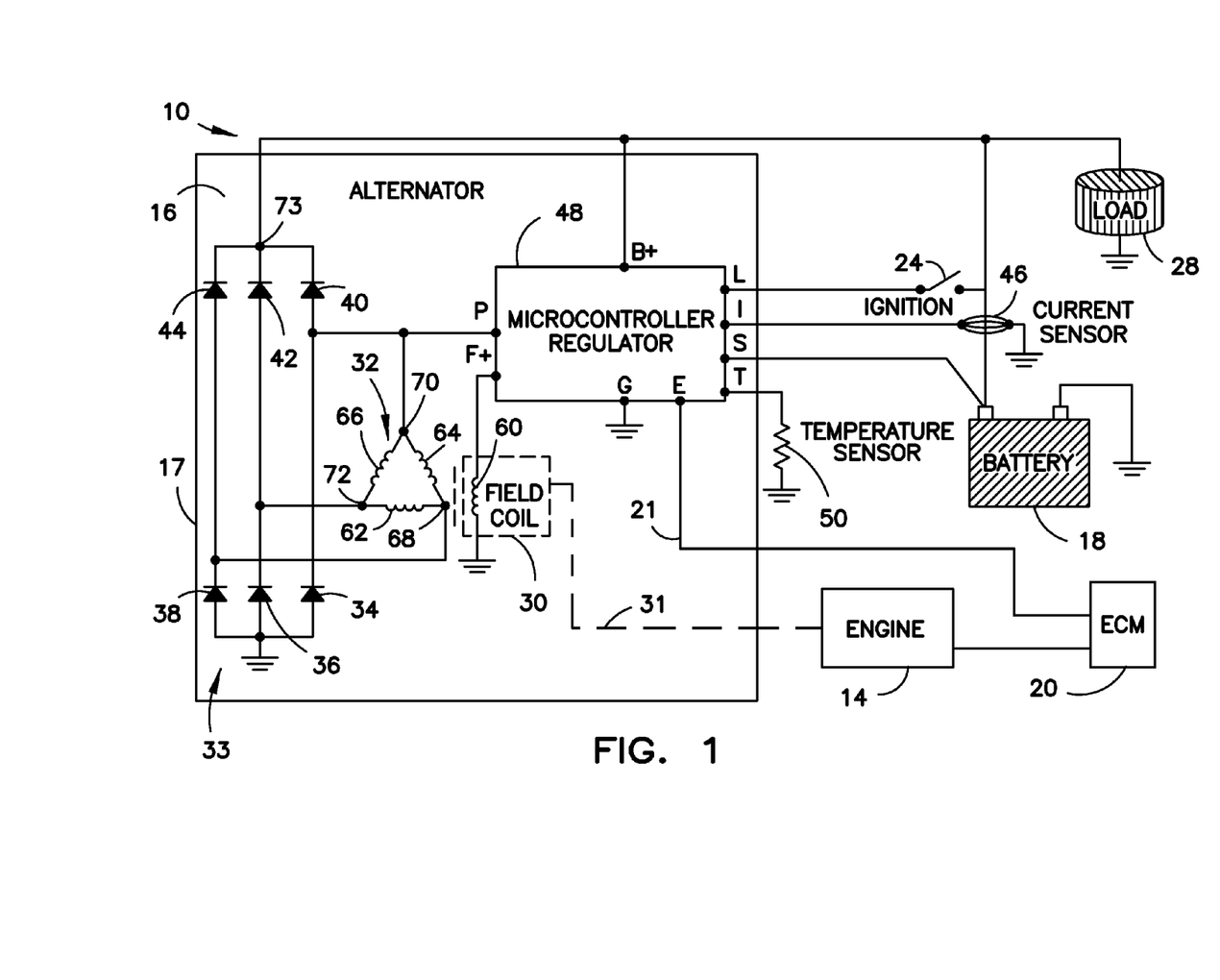
FIG. 1 is a block diagram of a vehicle having an engine and an alternator assembly, the alternator assembly being operable to control a set point voltage level of the alternator based at least in part on a mechanical load imparted on the engine.

As shown in FIG. 1, a vehicle 10 includes an engine 14, an alternator apparatus/assembly 16, a battery 18, and an engine control module 20. The word "vehicle," as used herein, refers to any device configured to carry or transport something or someone, including, without limitation, passenger cars, light trucks, commercial trucks, boats, trains, and airplanes. The engine 14 provides a drive torque for moving the vehicle 10; accordingly, the engine 14 may be any type of engine including an internal combustion engine. The battery 18 of the vehicle 10 may be any type of battery commonly used to power an electric starter motor assembly of an engine, including a 12-Volt lead acid battery. As described below, the alternator assembly 16 regulates its output power based on the mechanical load of the engine to increase the fuel economy of the engine.

The engine control module 20 ("ECM") is electrically connected to the engine 14 and to the alternator assembly 16. The ECM is configured to control the operation of the engine 14. The ECM 20 sends and receives electronic data to and from the engine 14 and the alternator apparatus 16 via a communication bus 21. The ECM 20 may include an electronic memory (not illustrated), which stores data such as a vehicle identification information. Vehicle identification information may include, for example, alpha-numeric codes that identify the vehicle make, model, and year. The ECM 20 may also send a signal to the alternator apparatus 16, which is indicative of the mechanical load of the engine 14.

The alternator apparatus 16, which may also be referred to as a rotating electrical machine, generates DC output power, which, among other functions, charges the battery 18 and supplies power to various electrical loads 28 carried by the vehicle 10. The alternator apparatus 16 includes a rotor 30, a stator 32, a rectifier 33, and a microcontroller voltage regulator 48, all positioned within a housing 17, as shown in FIG. 1. The housing 17 is typically a metal casing, such as a steel casing or a cast aluminum casing. It will be recognized, however, that the housing 17 could also be formed from one or more other suitable materials.

The rotor 30 of the alternator apparatus 16 includes a coil 60, which is electrically coupled to the regulator 48 to receive an electrical signal from the regulator. A rotational link 31, such as a belt, couples the engine 14 to the rotor 30, such that the coil 60 rotates relative to the stator 32 in response to the engine being in an operational state, as shown by the dashed line in FIG. 1. The electrical signal received by the coil 60 generates a magnetic field, which rotates as the engine 14 rotates the coil. The coil 60 is also referred to as a field coil, a rotatable coil, and an electromagnet.

The stator 32 includes a plurality of stator windings, which are referred to as phase coils 62, 64, 66. In response to the rotating magnetic field, the stator 32 generates the DC output voltage at the node 73. The DC output voltage has a magnitude that is based on, among other factors, the characteristics of the electrical signal applied to the coil 60. As shown in FIG. 1, the phase coils 62, 64, 66 are coupled in a Delta configuration. In another embodiment (not shown) the phase coils 62, 64, 66 are coupled in a Wye configuration.

The stator 32 is electrically coupled to the rectifier 33, which includes the diodes 34, 36, 38, 40, 42, 44. In the embodiment of FIG. 1, the phase coil 64 is electrically coupled between the node 70 and the node 68. The phase coil 66 is electrically coupled between the node 70 and the node 72. The phase coil 62 is electrically coupled between the node 72 and the node 68. The diode 34 is electrically coupled between the node 70 and electrical ground, the diode 36 is electrically coupled between the node 72 and electrical ground, and the diode 38 is electrically coupled between the node 68 and electrical ground. The diode 44 is electrically coupled between the node 68 and the node 73, the diode 42 is electrically coupled between the node 72 and the node 73, and the diode 40 is electrically coupled between the node 70 and the node 73. The alternator 16 generates the DC output voltage at the node 73.

As shown in FIG. 1, the voltage regulator 48 of the alternator apparatus 16, which may also be referred to as a "controller," is positioned within the housing 17. The regulator 48 controls an output voltage of the electrical machine 16. The regulator 48 includes various electrical input ports, output ports, and input/output ports ("I/O ports"), which are designated as F+, P, B+, L, I, S, T, E and G. The "F+" output designates the regulator 48 connection to the coil 60. The "P" input designates the regulator 48 connection to the phase coils 62, 64, 66. The "B+" input designates the regulator 48 connection to the battery 18. The "L" connection designates the regulator 48 connection to the ignition switch 24, which starts the engine 14 when closed. The optional "I" input designates the regulator 48 connection to a current sensor 46, which provides an output signal that indicates an amount of current flowing to and from the battery 18. The current sensor 46 is optional and may not be included in some embodiments of the alternator apparatus 16. The "S" input designates the external sense connection to the battery 18. The "T" input designates the regulator 48 connection to a temperature sensor 50 which may be located within the housing 17 of the alternator assembly 16 or outside of the housing of the alternator assembly. The "E" input designates the connection to the ECM 20. The "G" connection point represents the connection to ground. Additionally, the regulator 48, in some embodiments, may be positioned outside of the housing 17.

The regulator 48, among other functions, implements a voltage control program, which maintains the DC output voltage at a set point voltage level by controlling the electrical signal (usually measured as a magnitude of current) supplied to the coil 60. As used herein, the set point voltage level refers to a selected or a desired magnitude of the DC output voltage. In a vehicle having a 12.00 Volt system voltage, the regulator 48 typically targets a set point voltage of approximately 14.5 Volts; however, this target set point voltage is temperature dependent and may fluctuate by plus or minus 1.25 Volts. At the target set point voltage the electrical output of the alternator 16 is sufficient to charge the battery 18 and to supply the load 28 with electrical power.

The voltage control program implemented by the regulator 48 may be configured to vary the magnitude of the set point voltage level of the alternator assembly 16 depending on the acceleration of the vehicle 10. Specifically, the regulator 48 detects the acceleration of the vehicle 10 by monitoring the "P" input, such that the regulator 48 is configured as an acceleration sensor. As briefly described above, the "P" input detects the electrical frequency of the voltage generated in the stator 32, which is referred to herein as the stator frequency. The stator frequency increases when the rotational speed of the engine 14 increases (usually measured in revolutions per minute "RPM"), and the stator frequency decreases when the rotational speed of engine 14 decreases. An increasing stator frequency or a stator frequency above a threshold frequency corresponds to acceleration of the vehicle 10. A decreasing stator frequency or a stator frequency below a threshold frequency corresponds to deceleration of the vehicle 10. A stator frequency within a predetermined frequency range centered about zero acceleration may correspond to a cruising speed of the vehicle 10 and/or the vehicle being in a stopped position. It will be understood that deceleration is negative acceleration.

Figure 2:
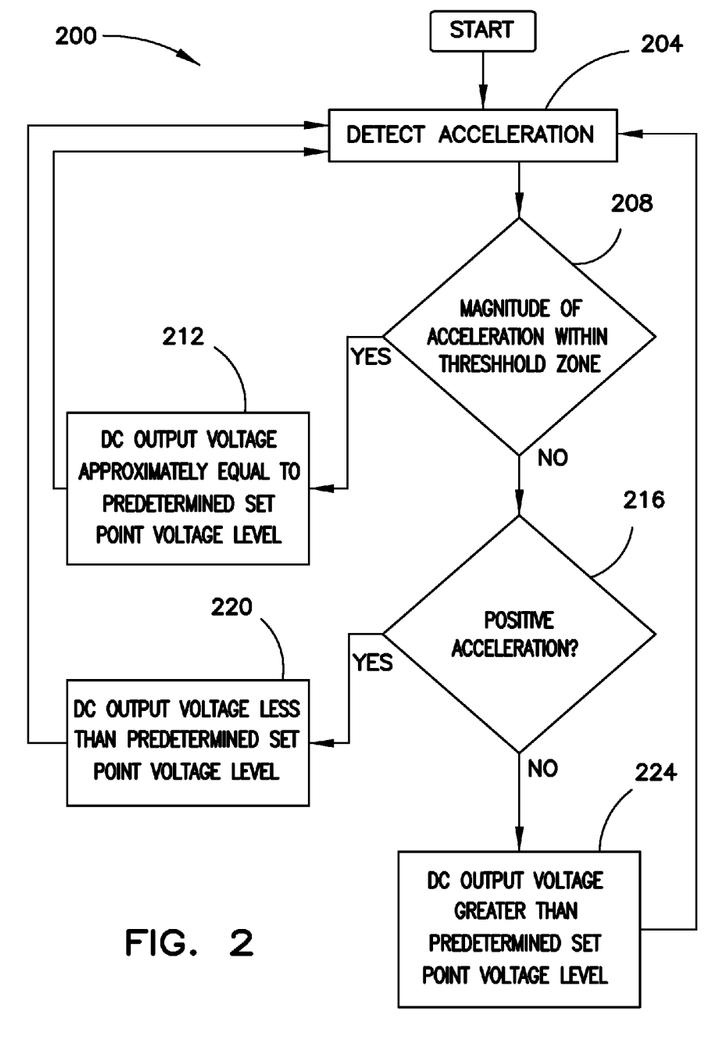
FIG. 2 is a flowchart illustrating a method of operating the alternator assembly of FIG. 1.
Figure 3:
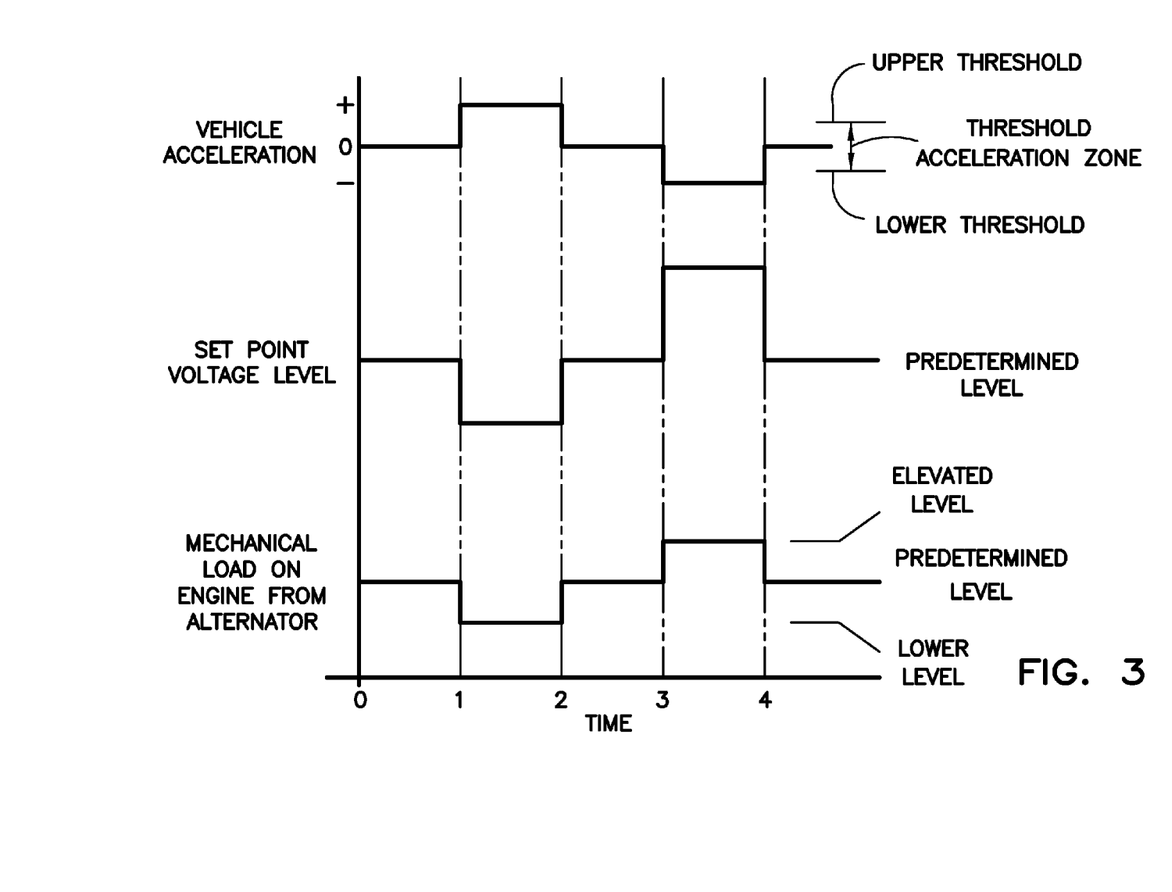
FIG. 3 is a graph of the mechanical load on the engine from the alternator of FIG. 1, the set point voltage level of the alternator, and the vehicle acceleration versus time.

The regulator 48 associated with the alternator assembly 16 of FIG. 1 may implement a method 200 of controlling the DC output voltage, which is illustrated by the flowchart of FIG. 2 and is supplemented by the graph of FIG. 3. The method 200 may be implemented as a software program stored in an electronic memory (not shown), which is associated with the regulator 48. To assist in the description of the method 200, the graph of FIG. 3 is described before the flowchart of FIG. 2.

As shown in FIG. 3, the acceleration of the vehicle 10, the set point voltage level, and the mechanical load imparted on engine 14 from the alternator 16 are each plotted versus time. The acceleration of the vehicle 10 is shown at an approximately zero value, a positive value, and a negative value. A threshold acceleration zone is centered about the approximately zero value. The vehicle 10 exhibits acceleration within the threshold acceleration zone when the vehicle is maintaining an approximately constant cruising speed and when the vehicle is stopped. The threshold acceleration zone is bounded by a lower threshold acceleration and an upper threshold acceleration. The lower threshold acceleration may correspond to a lower stator frequency threshold, and the upper threshold acceleration may correspond to an upper stator frequency threshold. The vehicle 10 exhibits acceleration greater than the upper threshold acceleration when the vehicle is accelerating to a cruising speed, as occurs, for example, when the vehicle accelerates to a cruising speed after being stopped at a traffic signal. The vehicle exhibits an acceleration less than the lower threshold acceleration when, for example, the vehicle is decelerating to a slower cruising speed and when the vehicle is decelerating to a stopped position.

In the graph of FIG. 3, the set point voltage level is shown at a predetermined set point voltage level, an elevated voltage level greater than the predetermined level, and a lower voltage level less than the predetermined level. The voltage generated by the alternator 16 at the predetermined set point voltage level is suitable to charge the battery 18 at a normal rate. The voltage generated by the alternator 16 at the elevated voltage level more quickly charges the battery as compared to the predetermined set point voltage level. The voltage generated by the alternator 16 at the lower voltage level less quickly charges the battery or, depending upon the charge state of the battery and the state of the electrical load 28, may result in electrical "discharge" of the battery. A "discharge" of the battery 18 occurs when the battery supplies electrical current to vehicle loads not supplied by the alternator assembly 16.

With reference still to FIG. 3, the mechanical load imparted on the engine 14 by the alternator 16 is illustrated at a predetermined load level, an elevated load level, and a lower load level. The load on the engine 14 at the predetermined load level represents the mechanical load on the engine when the DC output voltage is at the predetermined set point voltage level. At the elevated load level the alternator 16 imparts a mechanical load on the engine that is greater than the predetermined load level. The alternator 16 imparts the elevated load level on the engine 14 when set point voltage level is at the elevated voltage level. At the lower load level the alternator 16 imparts a mechanical load on the engine that is less than the predetermined load level. The alternator 16 imparts the lower load level on the engine 14 when the set point voltage level is at the lower voltage level.

With reference again to FIG. 2, the method 200 varies the set point voltage level of the regulator 48 based at least in part on the acceleration of the vehicle 10. As shown in block 204, the method 200 begins by detecting the acceleration of the vehicle 10. The alternator assembly 16 of FIG. 1, detects the acceleration of the vehicle 10 by monitoring the stator frequency at the "P" input of the regulator 48. Next, as shown in block 208 of FIG. 2, the regulator 48 determines if the detected acceleration is within the threshold acceleration zone (illustrated in FIG. 3 between the times 0 and 1, between the times 2 and 3, and after the time 4). As shown in block 212, in response to the acceleration of the vehicle 10 being within the threshold acceleration zone, the regulator 48 maintains the set point voltage level at the predetermined level. As described above, this occurs when the vehicle 10 is maintaining an approximately constant cruising speed and when the vehicle is in a stopped position.

As shown in block 216 of FIG. 2, if the detected acceleration of the vehicle 10 is outside of the threshold acceleration zone the regulator 48 varies or alters the voltage set point level depending on if the detected acceleration is positive or negative. As shown in block 220, if the detected acceleration of the vehicle 10 is positive and above the threshold acceleration zone (illustrated in FIG. 3 between the times 1 and 2), the regulator 48 reduces the set point voltage to the lower voltage level. Thus, when a user subjects the engine 14 to an increasing mechanical load, as occurs when accelerating the vehicle 10 to a cruising speed, the regulator 48 reduces the mechanical load imparted on the engine 14 by the alternator 16, as shown by the load on the engine 14 between the times 1 and 2 in the graph of FIG. 3. Accordingly, the reduced load on the engine 14 enables a greater portion of the torque generated by the engine to accelerate the vehicle 10. Stated differently, by reducing the voltage set point level, the electrical demand of the vehicle 10 is reduced, and the engine 14 may rotate the rotor 30 relative to the stator 32 with less mechanical resistance, thereby increasing the fuel economy of the engine 14.

As shown in block 224 of FIG. 2, if the detected acceleration of the vehicle 10 is negative and below the threshold acceleration zone (as shown in FIG. 3 between the times 3 and 4), the regulator 48 increases the magnitude of the set point voltage level above the predetermined level to the elevated voltage level. Decelerating the vehicle 10 requires less of the available engine torque than does accelerating the vehicle. Accordingly, when the vehicle is decelerating there is available more of the engine torque to rotate the rotor 30 of the alternator assembly 16. When the set point voltage is at the elevated voltage level the mechanical load on the engine 14 is increased (see between times 3 and 4 of FIG. 3), thereby making it more difficult for the engine 14 to rotate the rotor 30 relative to the stator 32. However, since the vehicle 10 requires only a fraction of the engine 14 torque when decelerating, most of the torque generated by the engine is available to rotate the rotor 30 and the other accessories connected to the engine, such as a water pump and/or a power steering pump (neither of which are illustrated). Accordingly, the operator of the vehicle 10 does not detect the increased load on the engine 14 during deceleration of the vehicle. Additionally, in some vehicle 10 applications, the increased mechanical load on the engine 14 from the alternator 16 may assist in decelerating the vehicle through an engine braking process.

In summary, the method 200 described above serves to increase the fuel economy of the engine 14. Specifically, fuel economy is increased by reducing the mechanical load on the engine 14 from the alternator 16 during periods of vehicle acceleration. This load reduction increases fuel economy by allocating more of the torque produced by the engine 14 during acceleration to components that are configured to move the vehicle, such as the transmission. Additionally, fuel economy is increased by increasing the load on the engine from the alternator during periods of vehicle deceleration. During periods of deceleration the engine 14 generally produces more torque than is required to decelerate the vehicle 10. The method 200 directs at least a portion of this "extra" torque toward electrical energy production by increasing the set point voltage level such that the alternator 16 generates more energy during the period of deceleration than it otherwise would if the set point voltage remained at the predetermined voltage set point level. This additional energy may be stored in the battery as chemical energy.

Figure 4:
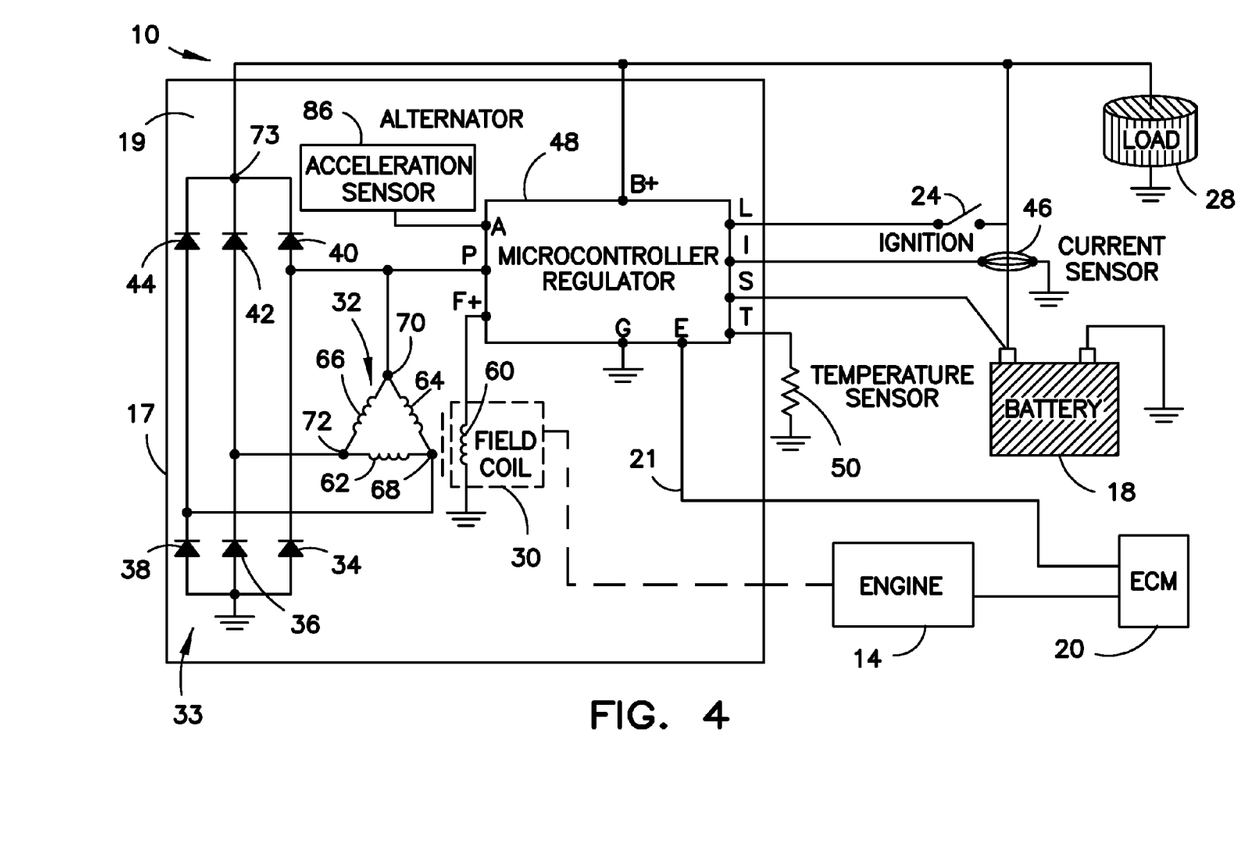
FIG. 4 is a block diagram of the vehicle of FIG. 1 having another embodiment of the alternator assembly, the alternator assembly including an acceleration sensor.

As shown in FIG. 4, a vehicle 10 having another embodiment of the alternator assembly 19 is provided. In addition to including each of the components of the alternator assembly 16 of FIG. 1, the alternator assembly 19 of FIG. 4 includes an acceleration sensor 86 fixed the vehicle 10 and coupled to an "A" input of the regulator 48. The acceleration sensor 86 is configured to detect the acceleration of the vehicle 10. Thus, the alternator assembly 19 may detect the acceleration of the vehicle 10 with reference to only the acceleration sensor 86, with reference to the "P" input of the regulator 48, or with reference to both the acceleration sensor 86 and the "P" input. In one particular embodiment, the acceleration sensor 86 includes an accelerometer(s) carried by the vehicle 10. The accelerometer is configured to detect the acceleration of the vehicle 10 in at least a forward and a reverse direction of vehicle travel. The accelerometer generates an electrical output, which represents the acceleration of the vehicle 10 when the vehicle is accelerating and decelerating. The acceleration sensor 86 may be any type of sensor configured to detect positive and negative acceleration of the vehicle 10. The alternator assembly 19 having the acceleration sensor 86 operates in the same manner as the alternator assembly 16, except that the alternator assembly 19 may detect the acceleration of the vehicle with the acceleration sensor 86.

Figure 5:
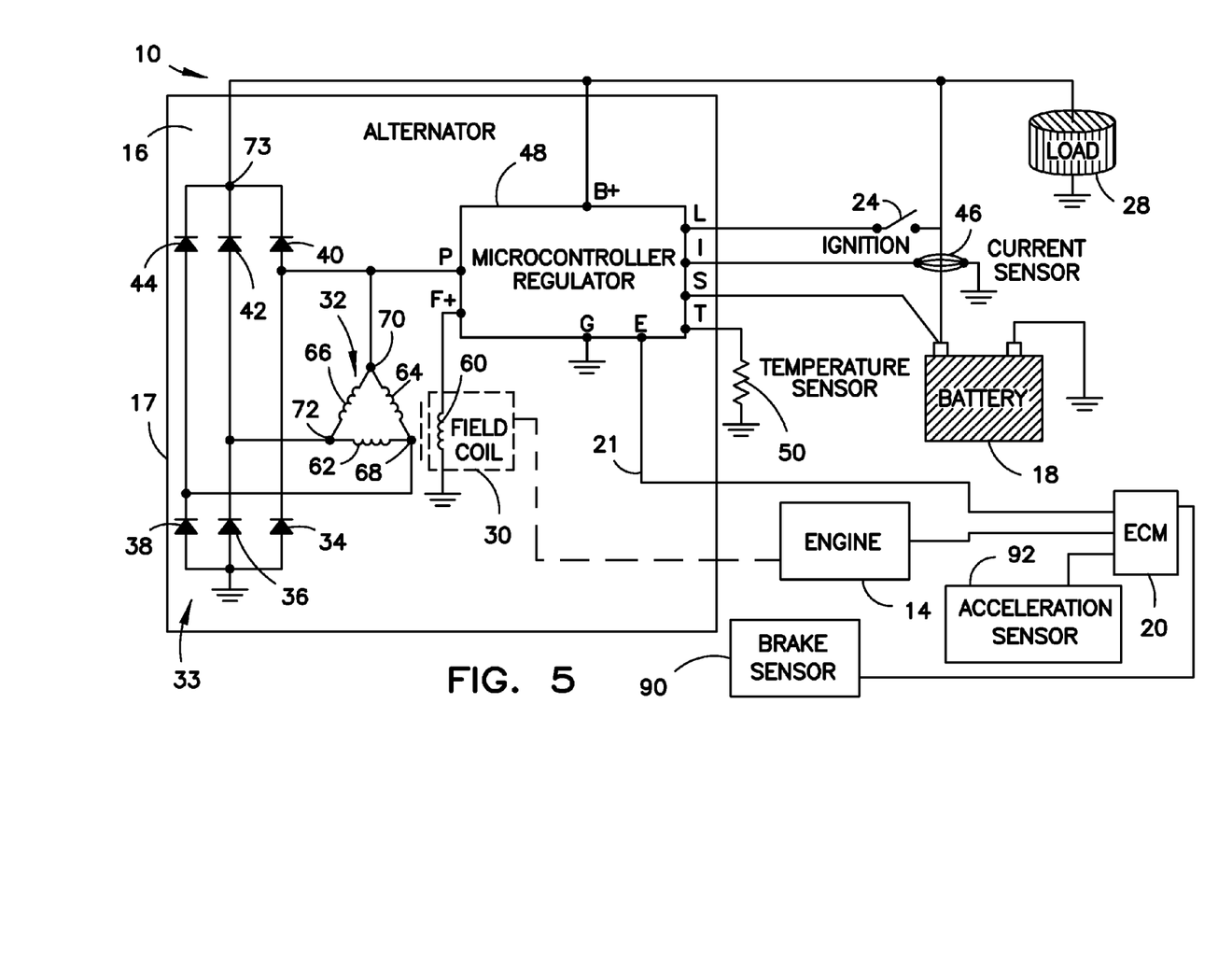
FIG. 5 is a block diagram of the vehicle of FIG. 1, the vehicle including a brake sensor and an acceleration sensor connected to an electronic control module of the engine.

As shown in FIG. 5, the vehicle 10 having the alternator assembly 16 of FIG. 1 may include a brake sensor 90 and an acceleration sensor 92 coupled to the ECM 20. The brake sensor 90 is configured to generate a brake signal in response to the operator of the vehicle 10 activating a vehicle braking system. Vehicle braking systems, as known to those of ordinary skill in the art, may be used to reduce the speed of the vehicle 10 and also to maintain the vehicle a stopped position. The brake sensor 90 may be positioned within a cabin (not illustrated) of the vehicle 10 near a foot pedal (not illustrated) of the vehicle braking system. Alternatively, the brake sensor 90 may be installed in a brake light socket (not illustrated) of the vehicle 10. As shown in FIG. 5, the brake sensor 90 is connected to the ECM 20; however, in other embodiments, the brake sensor 90 may be connected directly to the regulator 48. The brake sensor 90 communicates the brake signal to the ECM 20 through a wired and/or a wireless connection.

Figure 6:
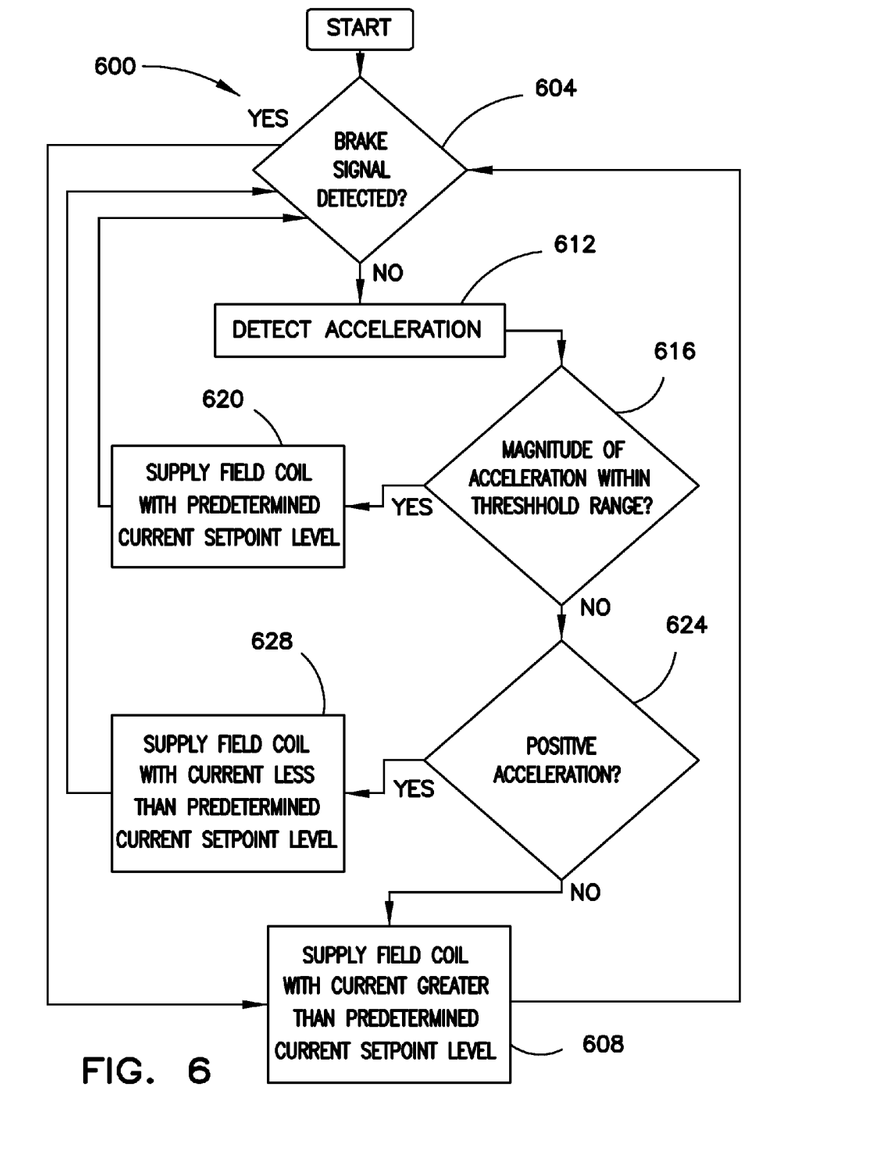
FIG. 6 is a flowchart illustrating a method of operating the alternator assembly of FIG. 5.

The vehicle 10 having a brake sensor 90 and an acceleration sensor 92 may, implement a method 600 of controlling the current supplied to the coil 60, which is illustrated by the flowchart of FIG. 6. As described herein, controlling the magnitude of the current supplied to the coil has the same effect as controlling the magnitude of the set point voltage. Accordingly, the regulator may implement a field current control program that is configured to carry out the method 600 shown by the flowchart of FIG. 6. The field current control program may be stored in an electric memory associated with the alternator and, in particular, the regulator. As described below, the field current control program causes one of numerous magnitudes of current to be delivered to the coil 60 depending at least in part on the acceleration of the vehicle 10.

As shown in FIG. 6, the method 600 is similar to the method 200 illustrated by the flowchart of FIG. 2, except that as shown in block 604 before the acceleration of the vehicle 10 is detected, the regulator 48 determines if the vehicle braking system is active by monitoring the brake signal. Additionally, the method 600 is described in terms of the magnitude of current supplied to the coil 60 instead of the set point voltage level. In response to the regulator 48 receiving the brake signal, the regulator determines that the vehicle 10 is decelerating. Accordingly, as shown in block 608, the regulator 48 increases the magnitude of the current supplied to the coil 60 above the predetermined set point current level (also referred to as an unadjusted current level). As shown in block 612, in the absence of the brake signal the regulator 48 detects the acceleration of the vehicle 10 with the acceleration sensor 92. Additionally, or alternatively, the regulator 48 may detect the acceleration of the vehicle 10 by monitoring the stator frequency at the "P" input. As shown in blocks 616 and 620, if the detected acceleration is within the threshold acceleration zone the regulator 48 maintains the current supplied to the coil 60 at the predetermined set point current level. As shown in block 624 and 628 if the detected acceleration is outside of the threshold acceleration and is positive the regulator 48 reduces the magnitude of the current supplied to the coil 60 (this indicates that the stator frequency is above the threshold stator frequency). As shown in block 608 if the detected acceleration is outside of the threshold acceleration and is negative, the regulator 48 increases the magnitude of the current supplied to the coil 60 above the predetermined set point current level (this indicates that the stator frequency is below the threshold stator frequency). It is noted that the vehicle 10 may decelerate even though the brake sensor 90 indicates that the vehicle braking system is inactive.

Figure 7:
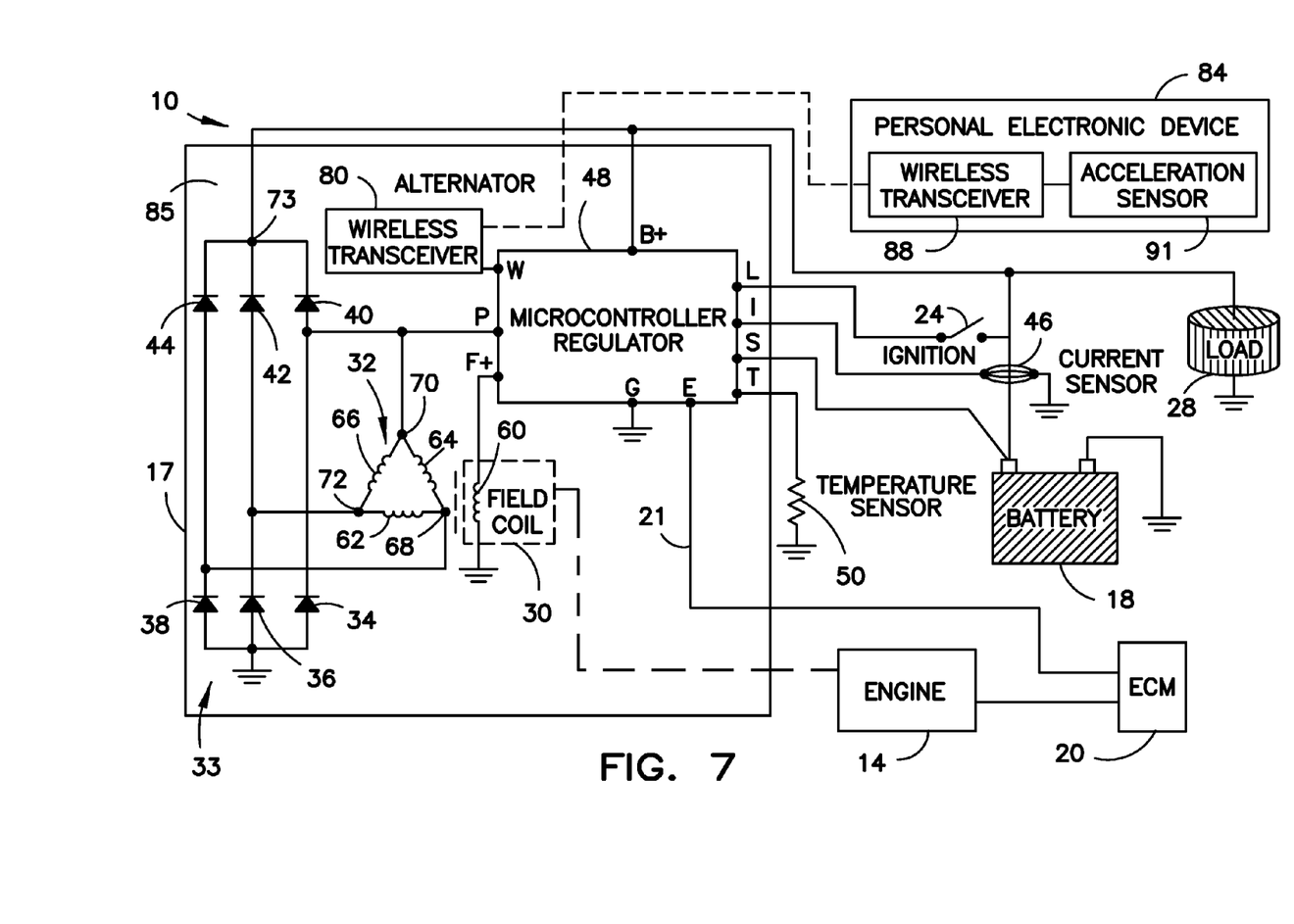
FIG. 7 is a block diagram of the vehicle of FIG. 1 having a personal electronic device and yet another embodiment of the alternator assembly.

As shown in FIG. 7, in another embodiment, the vehicle 10 may include an alternator assembly 85 configured to be associated with a personal electronic device 84. As the term is used herein, a personal electronic device 84 includes any type of handheld electronic device capable of detecting acceleration and transmitting an acceleration signal to the alternator assembly 16 and/or the ECM 20, and also providing the user with other features that are unrelated to acceleration detection, such as, for example, cellular communications, global positioning, gaming, and/or internet connectivity. Therefore, included by the term personal electronic device 84 are cellular telephones, portable music devices, and handheld gaming systems. The device 84 may be carried within the cabin (not illustrated) of the vehicle 10, such as on the person of the operator of the vehicle.

The device 84 includes at least one acceleration sensor 91 connected to a wireless transceiver 88. The wireless transceiver 88 communicates wireles sly with a wireless transceiver 80 connected to an "W" I/O port of the regulator 48, as shown in FIG. 7. The wireless transceiver 80 is a component of the alternator assembly 85 and may be positioned within or outside of the housing 17. It is noted that in another embodiment, the wireless transceiver 80 may be connected to the ECM 20 instead of the regulator 48. In such an embodiment, the ECM 20 transmits the signal generated by the acceleration sensor 91 to the regulator 48 through the bus 21. It is also noted that the alternator assembly 85 includes the same components and functions the same as the alternator assembly 16, except that the alternator assembly 85 includes the wireless transceiver 80 connected to the regulator 48.

The alternator assembly 85 associated with the personal electronic device 84 may be configured to operate according to the method 200 shown by the flowchart of FIG. 2. Except, that in addition to detecting the acceleration of the vehicle 10 by monitoring the "P" input, the regulator 48 may receive the acceleration signal from the device 84.

In each embodiment of the vehicle 10 and the alternator assembly 16, 19, 85, the acceleration of the vehicle 10 may also be determined by monitoring a vehicle speedometer signal, which is typically available to the EMC 20. The vehicle speedometer signal may be generated by a sensor configured to detect a vehicle wheel speed. Alternatively, the vehicle speedometer signal may be generated by a sensor in a transmission (not illustrated) of the vehicle 10. The ECM 20 processes the vehicle speedometer signal and generates an acceleration signal, which is delivered to the regulator 48 via the bus 21. Alternatively, the ECM 20 may deliver the acceleration signal directly to the regulator 48 and the regulator may process the signal to generate the acceleration signal.

In some embodiments, the regulator 48 and/or the ECM 20 may include an electronic memory (not shown) configured to store the charge history of the battery 18. In such an embodiment the regulator 48 and/or the ECM 20 monitors the charge history to prevent the battery 18 from becoming undercharged and/or overcharged. In particular, if the vehicle 10 frequently decelerates, the regulator 48 may frequently increase the set point voltage supplied to the coil 60 above the predetermined set point voltage level, which charges the battery 18 at a rate faster than the charge rate at the predetermined set point voltage level. To prevent the battery 18 from becoming overcharged, the regulator 48 may cease to increase the set point voltage above the predetermined set point voltage if the regulator detects that the vehicle 10 has frequently decelerated. Similarly, if the regulator 48 detects that the vehicle 10 frequently accelerates, the regulator may cease to decrease the set point voltage below the predetermined set point voltage in order to prevent the battery 18 from becoming undercharged.

In each embodiment of the alternator assembly 16, 19, 85, the regulator 48 may prevent the voltage/current supplied to the battery 18 from exceeding a maximum voltage/current level as specified by the manufacturer of the battery. In particular, the regulator 48 prevents the current supplied to the battery 18 from exceeding a current cold maximum. Accordingly, the alternator assembly 16, 19, 85 may be a vehicle specific component that is configured to function with the specific electrical requirements of a particular vehicle system.

Each embodiment of the alternator assembly 16, 19, 85 may be configured to convert kinetic energy of the engine 14 into chemical energy stored in the battery 18. In particular, the regulator 48 may increase the current/voltage supplied to the coil 60 at a time when the engine rotational speed is elevated but is decreasing, such as may occur between the times 3 and 4 of FIG. 3. As the engine rotational speed decreases, mechanical resistance provided by the alternator assembly 16, 19, 85 converts at least some of the kinetic energy of the engine 14 into electrical energy, which is stored by the battery 18 as chemical energy.

The alternator assembly 16, 19, 85 may be sold to a consumer in a number of ways. First, the alternator assembly 16, 19, 85 may be provided along with a newly manufactured vehicle 10. Second, the alternator assembly 16, the brake sensor 90, and/or the acceleration sensor 92 may be provided as a replacement part for an existing vehicle 10. In which case the alternator assembly 16 offers consumers a technology upgrade, which may lower the fuel consumption of the vehicle 10. Third, the alternator assembly 19, 85 may be provided as a replacement part for an existing vehicle 10 and may lower the fuel consumption of the vehicle. Packages including the alternator assembly 85 may include a personal electronic device 84; however, the vehicle user may also supply the personal electronic device. Fourth, the alternator assembly 16, 19, 85 may be provided as an alternator and engine starter package, which is configured to replace the existing alternator and engine starter (not illustrated) of the vehicle 10. Fifth, the regulator 48, the acceleration sensor 86, 92, and/or the brake sensor 90 may be provided separately to the consumer. In such an embodiment, the regulator 48 may replace the existing regulator of the vehicle 10. Alternatively, the regulator 48 may be electrically coupled to the existing regulator of the vehicle 10 and may override the control program of the existing regulator to implement the above-described methods 200, 600 of controlling the current supplied to the coil 60. In one particular example, the regulator 48 may replace existing 3G regulators, which are used in vehicles manufactured by Ford Motor Company. In another particular example, the regulator 48 may be electronically coupled to (e.g. be a plug-in) an existing regulator of an alternator used in a vehicle manufactured by the General Motors Company.

Figure 8:
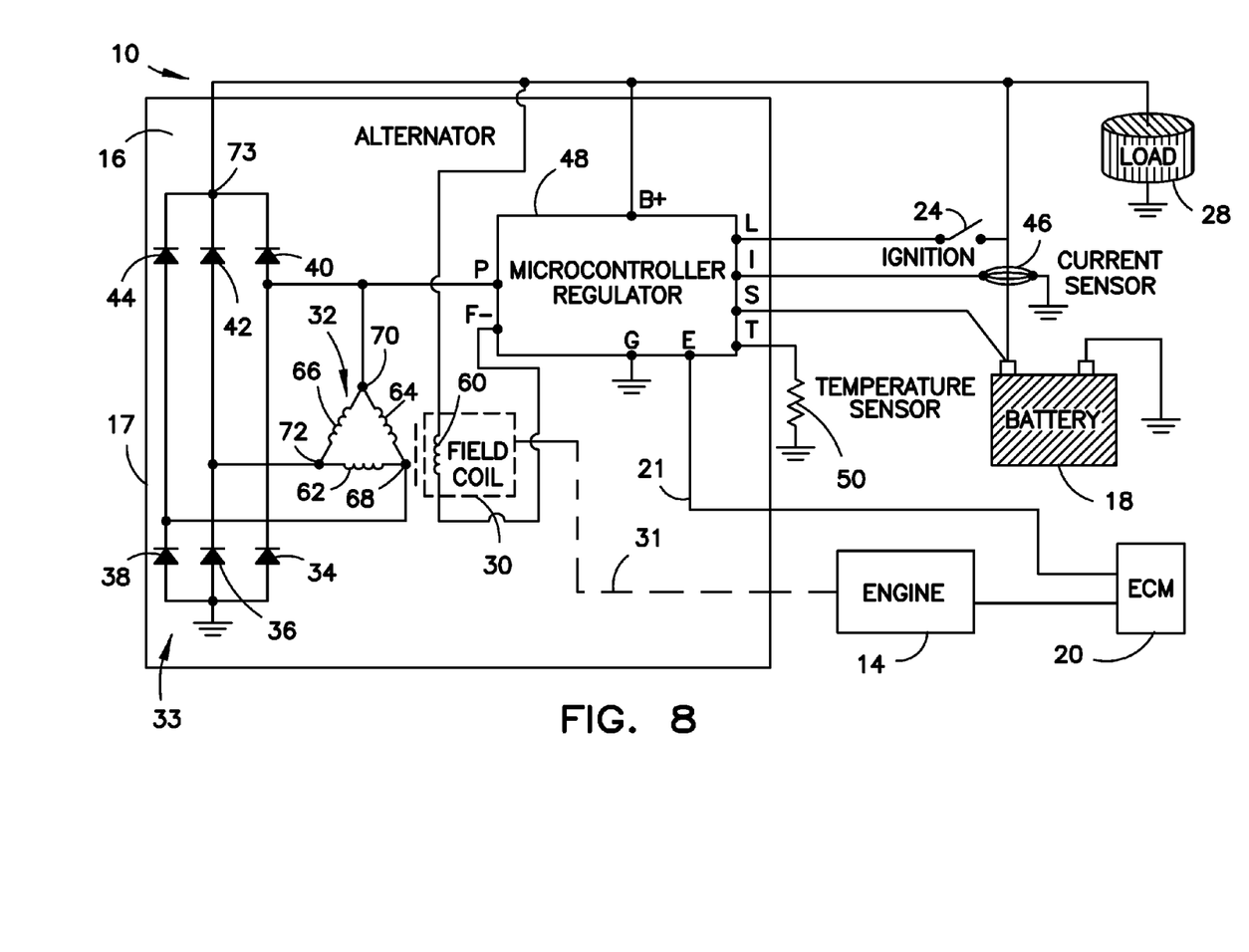
FIG. 8 is a block diagram of the vehicle of FIG. 1 having a regulator of the alternator assembly in an alternative configuration.

As shown in FIG. 8, the vehicle 10 and alternator assembly 16 of FIG. 1 are shown with the regulator 48 in an alternative configuration. The configuration of the regulator 48 in FIG. 8 may be described as a "low side drive" embodiment, in which the coil 60 is connected to the "B+" input of the regulator and to an "F−" input of the regulator. The "F−" input is the same physical input as the "F+" input; however, the input has been relabeled to reflect that it is connected to low potential side of the coil 60. This low side drive configuration may be applied to each embodiment of the alternator assembly 16, 19, 85 and vehicle 10 described above. Additionally, it is noted that the configuration of the regulator 48 shown in FIG. 1 may be referred to as a "high side drive" configuration, in which the coil 60 is connected to the "F+" input and to ground. The high side drive configuration may be applied to each embodiment of the alternator assembly 16, 19, 85 and vehicle 10 described above.

The alternator assembly 16, 19, 85 may also be configured for use in a hybrid vehicle application. As term is used herein, a hybrid vehicle refers to a vehicle having an engine and an electrical motor, both of which are configured to generate a drive torque, which moves the vehicle.

In another embodiment, the alternator assembly 16, 19, 85 may be a brushless alternator in which the electromagnet rotates but the field coil is stationary. The brushless alternator design is used in heavy duty application.

What is claimed is:

1. An electrical machine for a vehicle comprising:
a stator winding;
a rotatable electromagnet;
an acceleration sensor configured to detect an acceleration of the vehicle; and
a voltage regulator configured to control an output voltage of the electrical machine,
   wherein the voltage regulator is configured to vary the magnitude of the output voltage based at least in part on the detected acceleration of the vehicle,
   wherein the voltage regulator is configured to reduce the output voltage in response to the detected acceleration being greater than a first acceleration threshold,
   wherein the voltage regulator is configured to increase the output voltage in response to the detected acceleration being less than a second acceleration threshold, and
   wherein the voltage regulator does not adjust the output voltage in response to the detected acceleration being less than the first acceleration threshold and greater than the second acceleration threshold.

2. The electrical machine of claim 1 wherein acceleration of the vehicle is determined at least in part by an electrical frequency in the stator windings.

3. The electrical machine of claim 2, wherein the acceleration sensor is a frequency sensor configured to detect an electrical frequency in the stator winding, and the voltage regulator including a controller configured to execute a control program, the control program configured to cause the voltage regulator to deliver one of a plurality of currents of different magnitudes to the rotatable electromagnet depending at least in part on the detected electrical frequency in the stator winding, wherein
   the control program is configured to cause the regulator to deliver a decreased current to the rotatable electromagnet in response to a detected frequency being greater than a first frequency threshold,
   the control program is configured to cause the regulator to deliver an increased current to the rotatable electromagnet in response to the detected frequency being less than a second frequency threshold, and
   the control program is configured to cause the regulator to deliver an unadjusted current to the rotatable electromagnet in response to the detected frequency being less than the first frequency threshold and greater than the second frequency threshold, the unadjusted current having a magnitude between the magnitude of the decreased current and the magnitude of the increased current.

4. The electrical machine of claim 1 wherein acceleration of the vehicle is determined at least in part by an accelerometer carried by the vehicle.

5. The electrical machine of claim 4 wherein the accelerometer is fixed to the vehicle and is separate from the voltage regulator or an engine control module on the vehicle.

6. The electrical machine of claim 4 wherein the accelerometer is provided by a wireless personal electronic device.

7. The electrical machine of claim 1 wherein acceleration of the vehicle is determined based on analysis of a vehicle speedometer signal.

8. The electrical machine of claim 1 wherein acceleration of the vehicle includes either positive acceleration or negative acceleration.

9. The electrical machine of claim 8 wherein acceleration of the vehicle is determined at least in part by a brake sensor.

10. The electrical machine of claim 1 wherein the rotatable electromagnet is a field coil.

11. The electrical machine of claim 1 wherein (i) the acceleration sensor is an accelerometer separated from the voltage regulator or an engine control module of the vehicle and (ii) the rotatable electromagnet is a rotatable field coil.

12. The electrical machine of claim 11 further comprising:
a wireless transmitter electrically connected to the accelerometer and configured to transmit the detected acceleration to the controller.

13. The electrical machine of claim 12 wherein the wireless transmitter and the acceleration sensor are associated with a cellular telephone.

14. An alternator apparatus comprising:
a stator including a plurality of stator windings, the stator being associated with a vehicle;
a field coil;
an acceleration sensor configured to detect an acceleration of the vehicle; and
a regulator including a controller configured to execute a field current control program, the field current control program configured to cause the regulator to deliver one of a plurality of currents of different magnitudes to the field coil depending at least in part on the detected acceleration, wherein
   the field current control program causes the regulator to deliver a decreased current to the field coil in response to a detected frequency being greater than a first frequency threshold,
   the field current control program causes the regulator to deliver an increased current to the field coil in response to the detected frequency being less than a second frequency threshold, and
   the field current control program causes the regulator to deliver an unadjusted current to the field coil in response to the detected frequency being less than the first frequency threshold and greater than the second frequency threshold, the unadjusted current having a magnitude between the magnitude of the decreased current and the magnitude of the increased current.

15. The alternator apparatus of claim 14 wherein the acceleration sensor is a frequency sensor configured to detect an electrical frequency in one of the stator windings.

16. The alternator apparatus of claim 14 wherein:
the detected frequency is greater than the first frequency threshold in response to the vehicle exhibiting positive acceleration,
the detected frequency is less than the second frequency threshold in response to the vehicle exhibiting negative acceleration, and
the detected frequency is less than the first frequency threshold and greater than the second frequency threshold in response to the vehicle having approximately zero acceleration.

17. An alternator apparatus comprising:
a stator including a plurality of stator windings, the stator being associated with a vehicle;
a field coil;
an acceleration sensor configured to detect an acceleration of the vehicle; and a regulator including a controller configured to execute a field current control program the field current control program configured to cause the regulator to deliver one of a plurality of currents of different magnitudes to the field coil depending at least in part on the detected acceleration, wherein the field current control program causes the regulator to deliver a decreased current to the field coil in response to the detected acceleration being greater than a first acceleration threshold, the field current control program causes the regulator to deliver an increased current to the field coil in response to the detected acceleration being less than a second acceleration threshold, the field current control program causes the regulator to deliver an unadjusted current to the field coil in response to the detected acceleration being less than the first acceleration threshold and greater than the second acceleration threshold, the unadjusted current having a magnitude between the magnitude of the decreased current and the magnitude of the increased current.

18. The alternator apparatus of claim 17 wherein the acceleration of the vehicle is determined at least in part by an electrical frequency in the stator windings.

19. The alternator apparatus of claim 17 wherein the acceleration of the vehicle is determined at least in part by an accelerometer carried by the vehicle.

20. An alternator apparatus comprising:

a stator including a plurality of stator windings, the stator being associated with a vehicle;

a field coil;

an acceleration sensor configured to detect an acceleration of the vehicle;

a regulator including a controller configured to execute a field current control program the field current control program configured to cause the regulator to deliver one of a plurality of currents of different magnitudes to the field coil depending at least in part on the detected acceleration; and a brake sensor electrically connected to the regulator, the brake sensor configured to generate a brake signal in response to activation of a braking system associated with the vehicle;

wherein the field current control program causes the regulator to deliver an increased current to the field coil in response to the brake sensor generating the brake signal, wherein the field current control program causes the regulator to deliver one of a decreased current and an unadjusted current to the field coil in response to the brake sensor not generating the brake signal, and wherein the magnitude of the increased current is greater than the magnitude of decreased current and the magnitude of the unadjusted current.

* * * * *